United States Patent
Aoki (10) Patent No.: US 12,000,198 B2
(45) Date of Patent: Jun. 4, 2024

(54) LID SYSTEM

(71) Applicant: TOYOTA JIDOSHA KABUSHIKI KAISHA, Toyota (JP)

(72) Inventor: Yuya Aoki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 91 days.

(21) Appl. No.: 17/570,946

(22) Filed: Jan. 7, 2022

(65) Prior Publication Data

US 2022/0243520 A1 Aug. 4, 2022

(30) Foreign Application Priority Data

Feb. 1, 2021 (JP) .................................. 2021-014338

(51) Int. Cl.
*E05F 15/00* (2015.01)
*B60Q 9/00* (2006.01)
*E05F 15/73* (2015.01)

(52) U.S. Cl.
CPC ............... *E05F 15/73* (2015.01); *B60Q 9/00* (2013.01); *E05Y 2400/44* (2013.01); *E05Y 2400/45* (2013.01); *E05Y 2900/534* (2013.01)

(58) Field of Classification Search
CPC ....... E05F 15/73; B60Q 9/00; E05Y 2400/44; E05Y 2400/45; E05Y 2900/534
USPC ..................................................... 296/97.22
See application file for complete search history.

(56) References Cited

U.S. PATENT DOCUMENTS

| 2007/0027594 A1 | 2/2007 | McNevich et al. |
| 2009/0242291 A1 | 10/2009 | Sagawa et al. |
| 2020/0101860 A1 | 4/2020 | Ichikawa |
| 2020/0190889 A1* | 6/2020 | Jun ........................ B60L 53/665 |

FOREIGN PATENT DOCUMENTS

| JP | 08-284507 A | 10/1996 |
| JP | 2009-074280 A | 4/2009 |
| JP | 2009074280 | * 4/2009 |
| JP | 2009-227218 A | 10/2009 |
| JP | 2020-054180 A | 4/2020 |

* cited by examiner

*Primary Examiner* — Daniel J Troy
*Assistant Examiner* — Daniel Alvarez
(74) *Attorney, Agent, or Firm* — Sughrue Mion, PLLC (57) ABSTRACT

A lid system is a system including a plurality of lids of a vehicle, the system including: a first lid that covers a power supply port that receives AC power, the first lid being openable and closable; a second lid that covers a power supply port that receives DC power, the second lid being openable and closable; a lid opener for opening the first and second lids; a position detecting unit that detects a current position of the vehicle; and an ECU that controls the lid system. The ECU obtains positions of power supply facilities of the AC power or the DC power, specifies a power supply facility located at a position close to the current position detected by the position detecting unit, and performs a prescribed process for opening, by the lid opener, the lid corresponding to an energy source supplied by the specified power supply facility.

3 Claims, 11 Drawing Sheets

LID SYSTEM

This nonprovisional application is based on Japanese Patent Application No. 2021-014338 filed on Feb. 1, 2021 with the Japan Patent Office, the entire contents of which are hereby incorporated by reference.

BACKGROUND

Field

The present disclosure relates to a lid system, and particularly to a lid system including a plurality of lids of a vehicle.

Description of the Background Art

A vehicle adapted to both direct current (DC) charging and alternating current (AC) charging needs to include an inlet adapted to DC charging and an inlet adapted to AC charging. Depending on a structure of a vehicle, these inlets may be arranged at different positions of the vehicle and lids that cover the respective inlets may be provided.

It has been conventionally known that when a vehicle includes a plurality of lids as described above, e.g., when each of a plurality of charging ports is provided with a lid, or when a lid of an oil supply port and a lid of a charging port are provided, two lid openers for opening the lids are arranged to correspond to the arrangement relationship of the lids, in order to avoid confusion between opening and closing of the lids (refer to, for example, Japanese Patent Laying-Open No. 2009-074280).

SUMMARY

However, in a case where a vehicle includes a plurality of lids, it may in some cases be difficult for a user to determine which lid is to be opened when the user brings the vehicle closer to a supply facility of an energy source such as AC power, DC power, gasoline, light oil, or hydrogen.

The present disclosure has been made to solve the above-described problem, and an object of the present disclosure is to provide a lid system that can make it easier to open a lid corresponding to a supply facility of an energy source.

A lid system according to the present disclosure is a lid system including a plurality of lids of a vehicle, the lid system including: a first lid that covers a first receiving port that receives a first energy source, the first lid being openable and closable; a second lid that covers a second receiving port that receives a second energy source, the second lid being openable and closable; an operation unit for opening the first lid and the second lid; a detecting unit that detects a current position of the vehicle; and a control unit that controls the lid system.

The control unit obtains positions of supply facilities of the first energy source or the second energy source, specifies a supply facility of the supply facilities, the supply facility being located at a position close to the current position detected by the detecting unit, and performs a prescribed process for opening, by the operation unit, the lid corresponding to an energy source supplied by the specified supply facility.

According to the above-described configuration, the process for opening, by the operation unit, the lid corresponding to the energy source supplied by the supply facility located at the position close to the current position of the vehicle is performed. As a result, the lid corresponding to the supply facility of the energy source can be opened more easily.

The prescribed process may include a process for opening, in response to an operation by the operation unit, the lid corresponding to the energy source supplied by the specified supply facility.

According to the above-described configuration, the process for opening, in response to the operation by the operation unit, the lid corresponding to the energy source supplied by the supply facility located at the position close to the current position of the vehicle is performed. As a result, the lid corresponding to the supply facility of the energy source can be opened more easily.

The operation unit may be configured to be operable in two stages, and the control unit may open the lid corresponding to the energy source supplied by the specified supply facility, in response to a first-stage operation by the operation unit.

According to the above-described configuration, the process for opening the lid corresponding to the energy source supplied by the supply facility located at the position close to the current position of the vehicle, in response to the first-stage operation by the operation unit configured to be operable in two stages is performed. As a result, the lid corresponding to the supply facility of the energy source can be opened more easily.

The operation unit may be configured to designate the lid to be opened, through a second-stage operation, and the prescribed process may include a process for opening the lid designated through the second-stage operation by the operation unit, when the energy source supplied by the supply facility located at the position close to the current position detected by the detecting unit cannot be specified.

According to the above-described configuration, the process for opening the lid designated through the second-stage operation by the operation unit, when the energy source supplied by the supply facility located at the position close to the current position of the vehicle cannot be specified is performed. As a result, the lid corresponding to the supply facility of the energy source can be opened.

The prescribed process may include a process for not opening, in response to the operation by the operation unit, the lid that does not correspond to the energy source supplied by the specified supply facility.

According to the above-described configuration, the process for not opening, in response to the operation by the operation unit, the lid that does not correspond to the energy source supplied by the supply facility located at the position close to the current position of the vehicle is performed. As a result, the lid that does not correspond to the supply facility of the energy source cannot be opened.

The prescribed process may include a process for notifying a user about the lid corresponding to the energy source supplied by the specified supply facility, of the plurality of lids.

According to the above-described configuration, the process for notifying the user about the lid to be opened, which corresponds to the energy source supplied by the supply facility located at the position close to the current position of the vehicle, of the plurality of lids is performed. As a result, the lid corresponding to the supply facility of the energy source can be opened more easily.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Embodiments of the present disclosure will be described hereinafter with reference to the drawings. In the following description, the same components are given the same reference characters. Their names and functions are also the same. Therefore, detailed description about them will not be repeated.

First Embodiment

Figure 1:
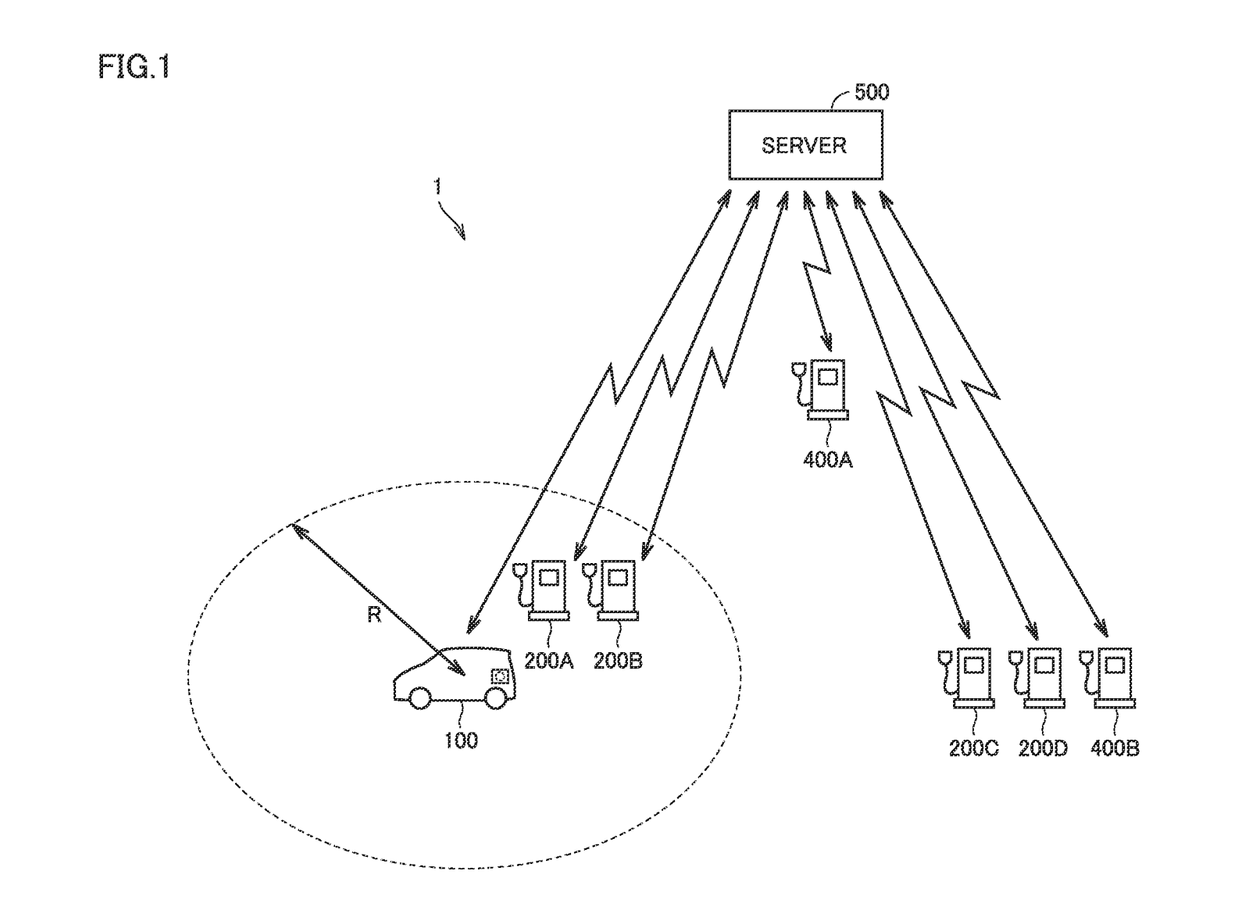
FIG. 1 is a schematic view showing a configuration of a vehicle system to which a lid system according to the present embodiment is applied.

FIG. 1 is a schematic view showing a configuration of a vehicle system 1 to which a lid system according to the present embodiment is applied. Referring to FIG. 1, vehicle system 1 includes a vehicle 100, DC power supply facilities 200A to 200D, AC power supply facilities 400A and 400B, and a server 500.

Vehicle 100 is configured to be AC chargeable and DC chargeable, and is configured to be wirelessly communicable with server 500. DC power supply facilities 200A to 200D are configured to be capable of supplying DC power to vehicle 100. AC power supply facilities 400A and 400B are configured to be capable of supplying AC power to vehicle 100. DC power supply facilities 200A to 200D and AC power supply facilities 400A and 400B are configured to be wirelessly or wiredly communicable with server 500.

Server 500 includes a CPU that can perform a prescribed process, a memory used as a working memory to store a program of the prescribed process and perform the process, and a communication unit that communicates with external devices such as vehicle 100, DC power supply facilities 200A to 200D and AC power supply facilities 400A and 400B through the Internet, a public network such as a public line and a public wireless local area network (LAN), and a private network such as an LAN and a virtual private network (VPN). Server 500 prestores positional information of the plurality of DC power supply facilities 200A to 200D and the plurality of AC power supply facilities 400A and 400B in the memory.

Figure 2:
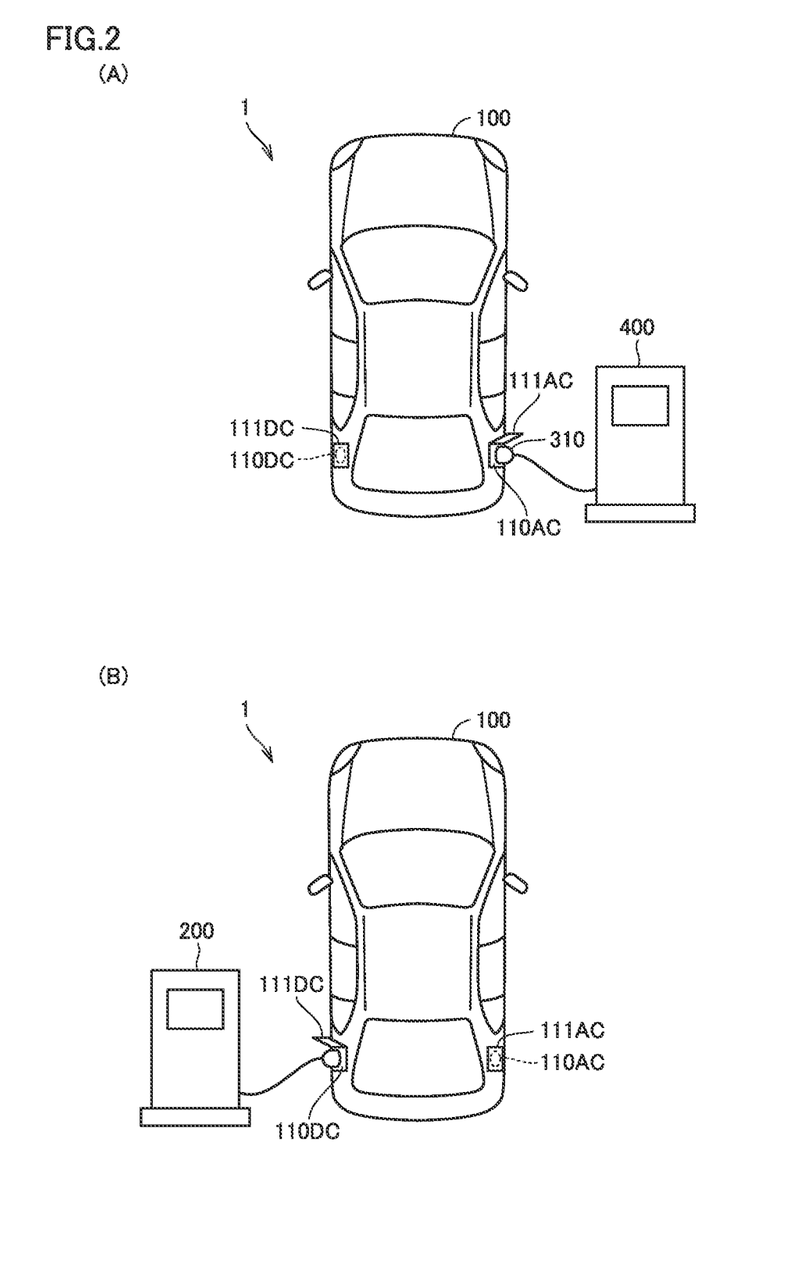
FIG. 2 shows an example of a power supply method for a vehicle according to the present embodiment.

FIG. 2 shows an example of a power supply method for vehicle 100 according to the present embodiment. Referring to FIG. 2, in vehicle 100 according to the present embodiment, a power supply port 110AC for AC charging is provided on the right side, and a power supply port 110DC for DC charging is provided on the left side. Power supply ports 110AC and 110DC are covered with openable and closable lids 111AC and 111DC, respectively.

Therefore, as shown in FIG. 2(A), at the time of AC charging, a user stops vehicle 100 such that AC power supply facility 400 is located on the right side of vehicle 100, and the user opens lid 111AC and connects a charging connector 310 to power supply port 110AC that serves as an inlet to which charging connector 310 is connected.

As shown in FIG. 2(B), at the time of DC charging, the user stops vehicle 100 such that DC power supply facility 200 is located on the left side of vehicle 100, and the user opens lid 111DC and connects a charging connector to power supply port 110DC to which the charging connector is connected.

Figure 3:
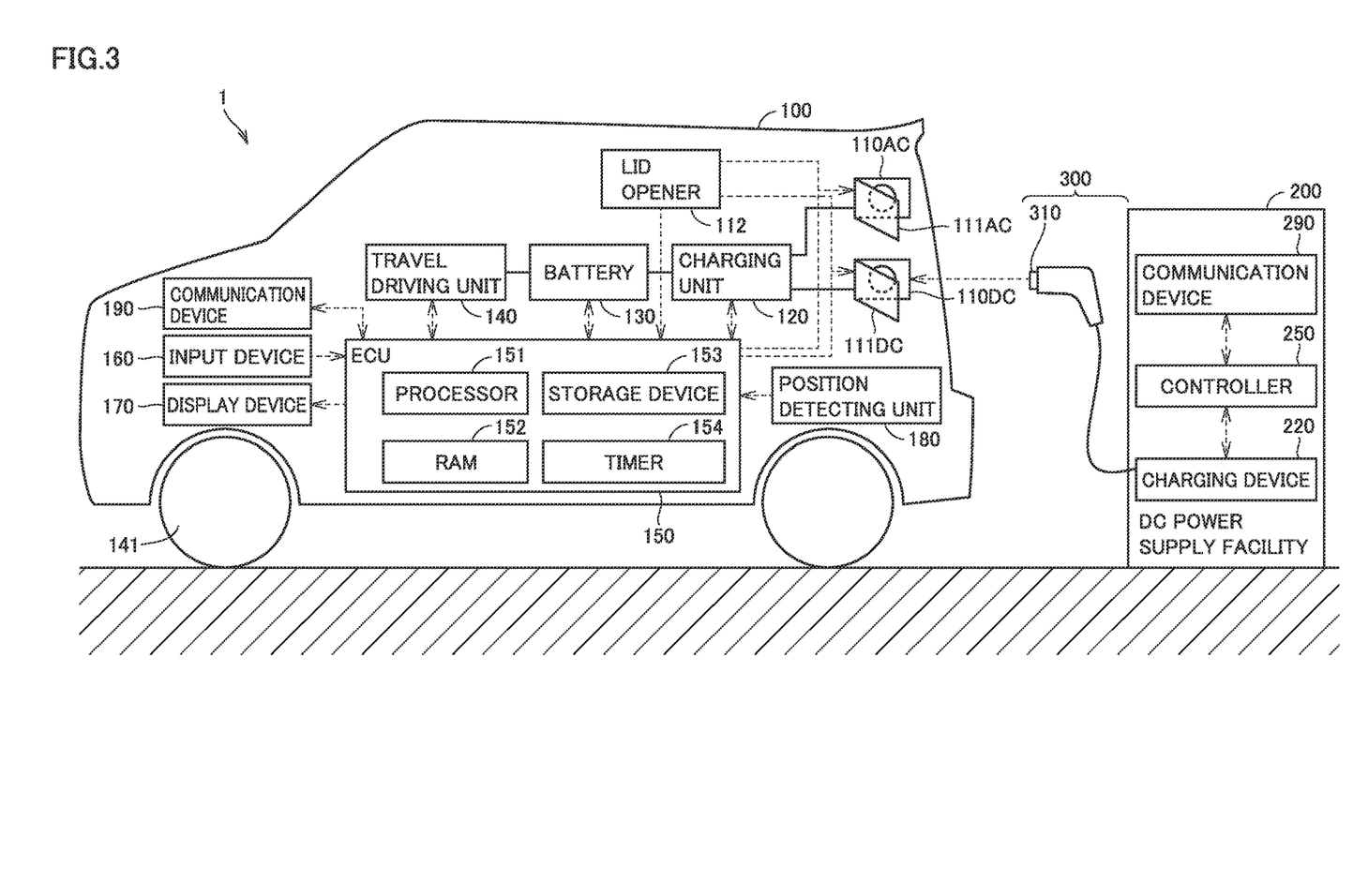
FIG. 3 is a configuration diagram of the vehicle and a power supply facility of the vehicle system according to the present embodiment.

FIG. 3 is a configuration diagram of the vehicle and the power supply facility of vehicle system 1 according to the present embodiment. Although FIG. 3 shows DC power supply facility 200, AC power supply facility 400 is also configured similarly to DC power supply facility 200 except for the type of electric power.

Referring to FIG. 3, vehicle 100 includes a battery 130 that stores electric power for traveling. Battery 130 includes a secondary battery such as, for example, a lithium-ion battery or a nickel-metal hydride battery. The secondary battery may be a battery cell, or may be an assembled battery. Instead of the secondary battery, another power storage device such as an electric double layer capacitor may be used.

Vehicle 100 can be supplied with electric power from DC power supply facility 200 to charge battery 130. In the present embodiment, DC power supply facility 200 is a power supply facility (e.g., quick charging facility) of DC power supply type (DC type). The power supply facility may be a public power supply facility, or may be a power supply facility placed at user's home. Vehicle 100 includes power supply port 110DC and a charging unit 120 that are adapted to the power supply type (e.g., DC type) of DC power supply facility 200. Charging unit 120 is also adapted to a power supply type (e.g., AC type) of AC power supply facility 400. Vehicle 100 also includes power supply port 110AC adapted to the power supply type (e.g., AC type) of AC power supply facility 400. Power supply ports 110AC and 110DC are covered with openable and closable lids 111AC and 111DC, respectively.

The power supply facility may be a power supply facility (e.g., normal charging facility) of AC power supply type (AC type). Although FIG. 3 shows the plurality of power supply ports for the respective power supply types so as to be adapted to the plurality of power supply types, vehicle 100 may include a power supply port adapted to one power supply type.

A charging cable 300 is connected to DC power supply facility 200. In the present embodiment, charging cable 300 is constantly connected to the power supply facility such as DC power supply facility 200. However, the present disclosure is not limited to the foregoing. Charging cable 300 may be attachable and detachable to and from DC power supply facility 200 or AC power supply facility 400. Charging cable 300 includes charging connector 310 at a tip thereof, and includes a signal line and a power line therein. When charging connector 310 of charging cable 300 connected to DC power supply facility 200 is connected to power supply port 110DC of vehicle 100, DC power supply facility 200 and vehicle 100 are electrically connected to each other. As a result, electric power can be supplied from DC power supply facility 200 through charging cable 300 to vehicle 100. The same applies as well to AC power supply facility 400.

Charging unit 120 of vehicle 100 includes a circuit (e.g., a not-shown power conversion circuit and a not-shown filter circuit) that performs a prescribed process on the electric power input to power supply ports 110AC and 110DC. As a result of the above-described process by the circuit, electric power (DC power) suitable for charging of battery 130 is output from charging unit 120 to battery 130. Charging unit 120 is configured to be capable of performing external charging of battery 130 using the electric power supplied from outside vehicle 100. Charging unit 120 further includes a charging relay (not shown) controlled to an on state and an off state by an ECU 150. The charging relay is in the on state (conductive state) during charging of battery 130 using the electric power supplied from outside vehicle 100 (e.g., DC power supply facility 200 or AC power supply facility 400).

In addition to power supply ports 110AC and 110DC, charging unit 120 and battery 130 described above, vehicle 100 further includes a travel driving unit 140, ECU 150, an input device 160, a display device 170, a position detecting unit 180, a communication device 190, a driving wheel 141, and a lid opener 112. A drive system of vehicle 100 is not limited to front-wheel drive shown in FIG. 3, and may be rear-wheel drive or four-wheel drive.

Travel driving unit 140 includes a not-shown power control unit (PCU) and a not-shown motor generator (MG), and is configured to cause vehicle 100 to travel using the electric power stored in battery 130. The PCU includes, for example, a controller including a processor, an inverter, and a converter (all are not shown). The controller of the PCU is configured to receive an instruction (control signal) from ECU 150 and control the inverter and the converter of the PCU in accordance with the instruction. The MG is implemented by, for example, a three-phase AC motor generator. The MG is configured to be driven by the PCU and rotate driving wheel 141. The MG is also configured to perform regenerative power generation and supply the generated electric power to battery 130.

In addition to the above-described secondary battery, battery 130 includes a system main relay (SMR) controlled to an on state and an off state by ECU 150, and a monitoring unit that monitors a state of battery 130 (both are not shown). The SMR is arranged in a power path extending from battery 130 to travel driving unit 140, and is in the on state (conductive state) during traveling using the electric power of battery 130. The monitoring unit includes various sensors that detect the state (e.g., a temperature, a current and a voltage) of battery 130, and outputs the detection results to ECU 150. Based on the outputs from the monitoring unit (i.e., detection values by various sensors), ECU 150 can obtain the state (e.g., a temperature, a current, a voltage, a state of charge (SOC), and an internal resistance) of battery 130.

ECU 150 includes a processor 151, a random access memory (RAM) 152, a storage device 153, and a timer 154. A central processing unit (CPU) can, for example, be used as processor 151. RAM 152 functions as a working memory that temporarily stores data processed by processor 151. Storage device 153 is configured to be capable of saving the stored information. Storage device 153 includes, for example, a read only memory (ROM) and a rewritable non-volatile memory. In addition to a program, information (e.g., a map, a mathematical expression and various parameters) used in the program is stored in storage device 153. The number of processors included in ECU 150 is arbitrary, and processors may be provided for each prescribed control.

Timer 154 is configured to inform processor 151 about the arrival of the set time. When the time set in timer 154 comes, a signal indicating that the time has come is transmitted from timer 154 to processor 151. In the present embodiment, a timer circuit is used as timer 154. However, timer 154 may be implemented by software, not by hardware (timer circuit).

Input device 160 is a device that receives an input from a user. Input device 160 is operated by the user and outputs a signal corresponding to the operation by the user to ECU 150. A communication method may be wired or wireless. Examples of input device 160 include various switches (such as a push button switch and a slide switch), various pointing devices (such as a mouse and a touch pad), a keyboard, and a touch panel. Input device 160 may be an operation unit of a car navigation system.

Display device 170 is configured to display information about vehicle 100 to the user (e.g., a driver of vehicle 100) in response to a request from ECU 150. In the present embodiment, a touch panel display of a car navigation system is used as display device 170. However, the present disclosure is not limited to the foregoing. Any human machine interface (HMI) can be used as display device 170 and input device 160. Display device 170 may have a speaker function.

Position detecting unit 180 is configured to detect a position of vehicle 100. The detection result by position detecting unit 180 is output to ECU 150. A global positioning system (GPS) receiver included in a car navigation system can, for example, be used as position detecting unit 180. However, the present disclosure is not limited to the foregoing. Position detecting unit 180 may be configured to calculate the position of vehicle 100 based on detection results by various sensors (e.g., a wheel sensor, a yaw rate sensor and an acceleration sensor) that detect a movement direction and an amount of movement of vehicle 100.

Communication device 190 is a device for wirelessly communicating with an external device such as server 500. Communication device 190 transmits transmission information from ECU 150 to the external device, and passes reception information from the external device to ECU 150.

Lid opener 112 is an operation unit for opening lid 111AC of power supply port 110AC and lid 111DC of power supply port 110DC. Lid opener 112 is configured to be capable of opening lids 111AC and 111DC when lid opener 112 is operated by the user. Details of lid opener 112 will be described below.

It has been conventionally known that when vehicle 100 includes a plurality of lids 111AC and 111DC as described above, e.g., when a plurality of power supply ports 110AC and 110DC are provided with lids 111AC and 111DC, respectively, two lid openers for opening lids 111AC and 111DC are arranged to correspond to the arrangement relationship of lids 111AC and 111DC, in order to avoid confusion between opening and closing of lids 111AC and 111DC.

However, in a case where vehicle 100 includes a plurality of lids 111AC and 111DC, it may in some cases be difficult for the user to determine which of lids 111AC and 111DC is to be opened when the user brings vehicle 100 closer to the supply facility of the energy source (e.g., DC power supply facility 200 or AC power supply facility 400).

Thus, ECU 150 obtains positions of supply facilities of energy sources, specifies the supply facility located at a position close to the current position of vehicle 100 detected by position detecting unit 180, and performs a prescribed process for opening, by lid opener 112, the lid corresponding to the energy source supplied by the specified supply facility.

Therefore, the process for opening, by the lid opener, the lid corresponding to the energy source supplied by the supply facility located at the position close to the current position of vehicle 100 is performed. As a result, the lid corresponding to the supply facility of the energy source can be opened more easily.

Figure 4:
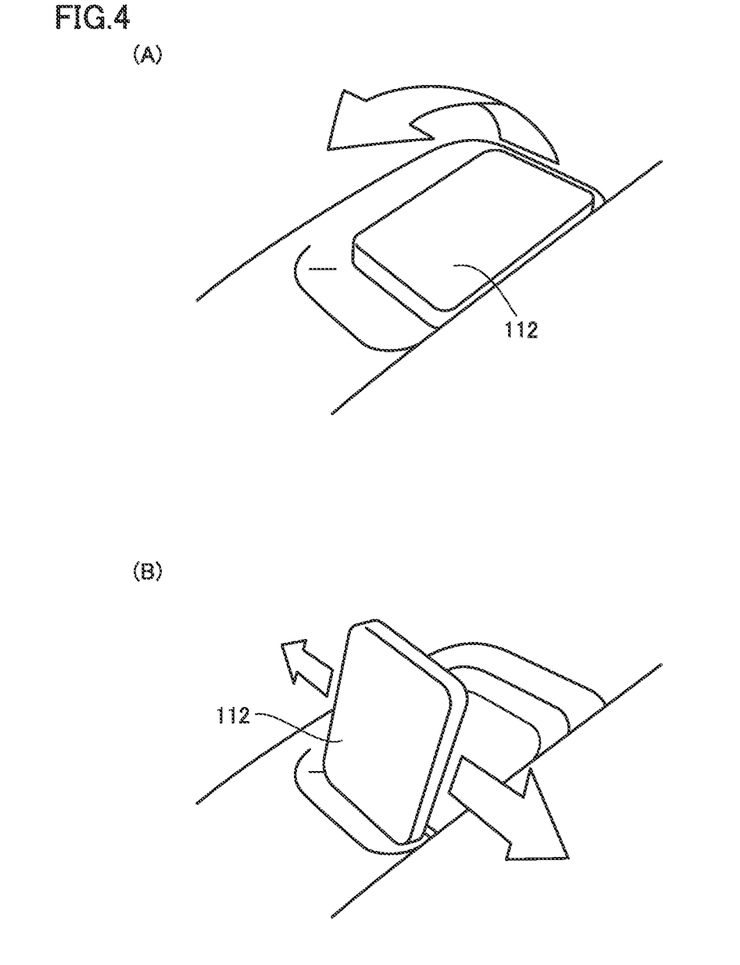
FIG. 4 schematically shows a lid opener in the first embodiment.

FIG. 4 schematically shows lid opener 112 in the first embodiment. Referring to FIG. 4, in the present embodiment, lid opener 112 is provided on a floor surface between a driver's seat and a door on the driver's seat side in the vehicle interior, as in a general vehicle. However, lid opener 112 may be provided at another position. The upper right side in FIG. 4 with respect to lid opener 112 corresponds to the front side of vehicle 100.

As shown in FIG. 4(A), lid opener 112 is configured such that lid opener 112 can be first pulled toward the user (toward the rear side of vehicle 100). As shown in FIG. 4(B), lid opener 112 is configured such that after being pulled toward the user, lid opener 112 can be inclined to the right and left sides. Lid opener 112 and lids 111AC and 111DC are configured such that when lid opener 112 is inclined to the left side, lid 111DC on the left side of vehicle 100 shown in FIG. 2 is opened, and when lid opener 112 is inclined to the right side, lid 111AC on the right side of vehicle 100 shown in FIG. 2 is opened.

In the present embodiment, lid opener 112 includes a sensor (not shown) that can detect that lid opener 112 has been pulled toward the user, and a sensor (not shown) that can detect a direction of inclination. These sensors of lid opener 112 transmit signals indicating the detected states to ECU 150 as shown in FIG. 3.

Each of lids 111AC and 111DC includes an actuator (not shown) that opens each of lids 111AC and 111DC when the actuator receives a control signal from ECU 150.

Upon reception of the signal indicating the direction of inclination from lid opener 112, ECU 150 transmits a control signal for opening lid 111DC on the left side of vehicle 100 to lid 111DC, when the received signal indicates that lid opener 112 has been inclined to the left side. When the actuator of lid 111DC receives this control signal from ECU 150, the actuator of lid 111DC operates to open lid 111DC. As described above, lid opener 112 is inclined to the left side because lid 111DC is provided on the left side of vehicle 100, and thus, lid 111DC is opened.

Upon reception of the signal indicating the direction of inclination from lid opener 112, ECU 150 transmits a control signal for opening lid 111AC on the right side of vehicle 100 to lid 111AC when the received signal indicates that lid opener 112 has been inclined to the right side. When the actuator of lid 111AC receives this control signal from ECU 150, the actuator of lid 111AC operates to open lid 111AC. As described above, lid opener 112 is inclined to the right side because lid 111AC is provided on the right side of vehicle 100, and thus, lid 111AC is opened.

Figure 5:
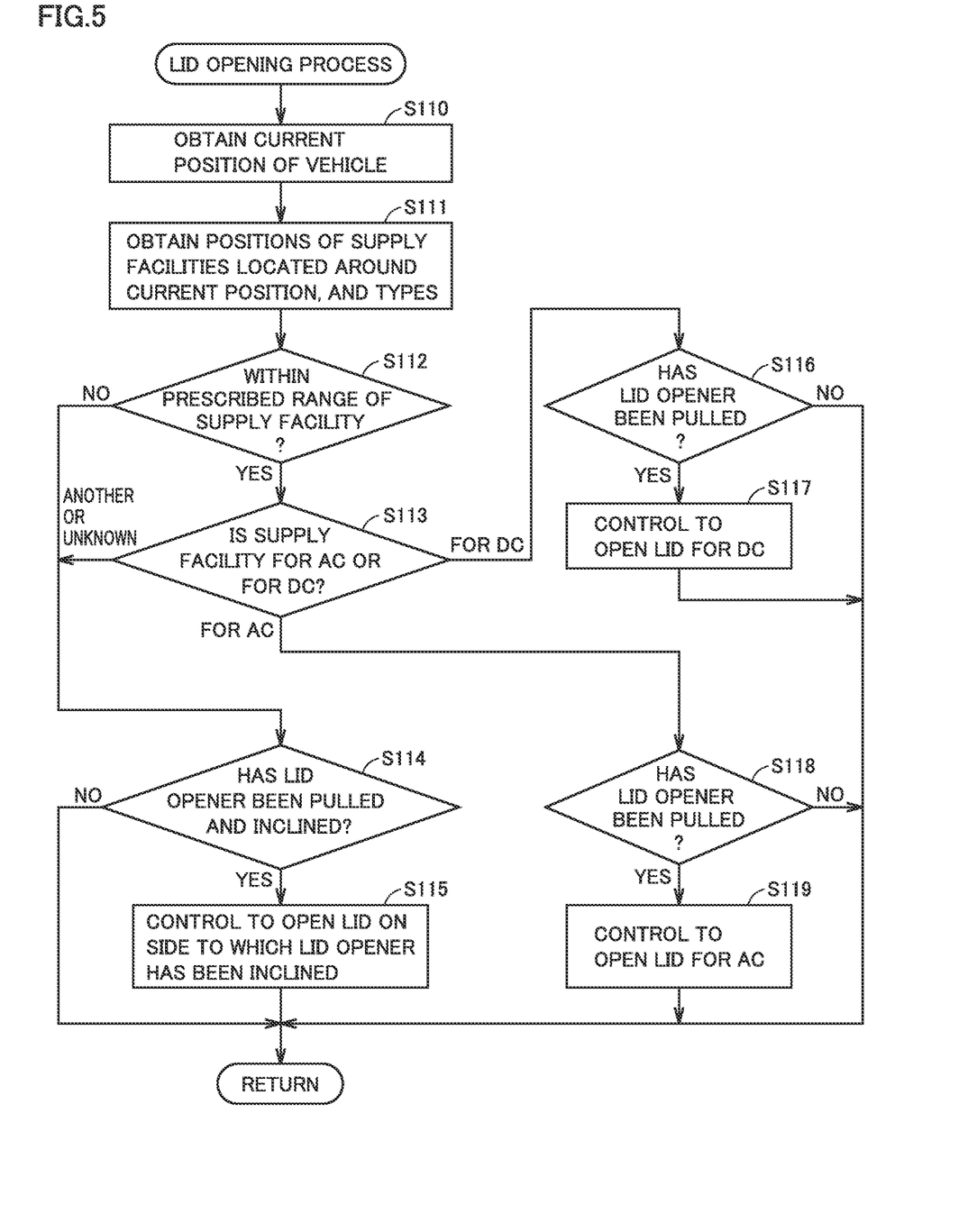
FIG. 5 is a flowchart showing a flow of a lid opening process in the first embodiment.

FIG. 5 is a flowchart showing a flow of a lid opening process in the first embodiment. The lid opening process is invoked from a higher-level process every prescribed time period and performed by processor 151 of ECU 150 of vehicle 100. Referring to FIG. 5, processor 151 obtains a current position of vehicle 100, using a detection result by position detecting unit 180 (step S110).

Next, processor 151 obtains, from server 500, positions of supply facilities of energy sources (e.g., AC power supply facilities 400, DC power supply facilities 200, gasoline supply facilities, light oil supply facilities, or hydrogen supply facilities) located around the current position (e.g., within a distance R shown in FIG. 1) and types of supplied energy sources (e.g., AC power, DC power, gasoline, light oil, or hydrogen) (step S111). Server 500 prestores the positions of the supply facilities of the energy sources and the types of supplied energy sources in association with each other.

Processor 151 determines whether vehicle 100 has entered a prescribed range (e.g., within several tens of meters, such as within ten meters) of any one of the supply facilities whose information has been obtained in step S111 (step S112). When processor 151 determines that vehicle 100 has entered the prescribed range of the supply facility (YES in step S112), processor 151 determines whether the supply facility is AC power supply facility 400, DC power supply facility 200, or another supply facility or an unknown supply facility (step S113).

When processor 151 determines that vehicle 100 has not entered the prescribed range of the supply facility (NO in step S112), and when processor 151 determines in step S113 that the supply facility is another supply facility or an unknown supply facility, processor 151 determines whether lid opener 112 has been pulled and inclined, using the signals from the sensors of lid opener 112 (step S114).

When processor 151 determines that lid opener 112 has been pulled and inclined (YES in step S114), processor 151 controls the actuator of lid 111AC or lid 111DC to open the lid on the side to which lid opener 112 has been inclined, of two lids 111AC and 111DC (step S115).

When processor 151 determines that lid opener 112 has not been pulled and inclined (NO in step S114), and after step S115, processor 151 returns the process to the higher-level process from which the lid opening process has been invoked.

When processor 151 determines in step S113 that the supply facility is DC power supply facility 200, processor 151 determines whether lid opener 112 has been pulled but has not yet been inclined, using the signals from the sensors of lid opener 112 (step S116). When processor 151 determines that lid opener 112 has been pulled but has not yet been inclined (YES in step S116), processor 151 controls the actuator of lid 111DC to open lid 111DC for DC charging (step S117). Specifically, processor 151 transmits the control signal for opening lid 111DC to lid 111DC, and in accordance with this control signal, the actuator of lid 111DC operates to open lid 111DC. Even when lid opener 112 is pulled and then inclined to the side (here, right side) opposite to the side (here, left side) corresponding to lid 111DC to be opened, processor 151 performs control so as not to open lid 111AC corresponding to the side to which lid opener 112 is inclined. Specifically, even when lid opener 112 is pulled and inclined to the right side, processor 151 does not transmit the control signal for opening lid 111AC on the right side of vehicle 100.

When processor 151 determines that lid opener 112 has not been pulled (NO in step S116), and after step S117, processor 151 returns the process to the higher-level process from which the lid opening process has been invoked.

When processor 151 determines in step S113 that the supply facility is AC power supply facility 400, processor 151 determines whether lid opener 112 has been pulled but has not yet been inclined, using the signals from the sensors of lid opener 112 (step S118). When processor 151 determines that lid opener 112 has been pulled but has not yet been inclined (YES in step S118), processor 151 controls the actuator of lid 111AC to open lid 111AC for AC charging (step S119). Specifically, processor 151 transmits the control signal for opening lid 111AC to lid 111AC, and in accordance with this control signal, the actuator of lid 111AC operates to open lid 111AC. Even when lid opener 112 is pulled and then inclined to the side (here, left side) opposite to the side (here, right side) corresponding to lid 111AC to be opened, processor 151 performs control so as not to open lid 111DC corresponding to the side to which lid opener 112 is inclined. Specifically, even when lid opener 112 is pulled and inclined to the left side, processor 151 does not transmit the control signal for opening lid 111DC on the left side of vehicle 100.

When processor 151 determines that lid opener 112 has not been pulled (NO in step S118), and after step S119, processor 151 returns the process to the higher-level process from which the lid opening process has been invoked.

Second Embodiment

In the first embodiment, when a first-stage operation of lid opener 112 is performed, the lid corresponding to the type of energy source supplied by the supply facility located within the prescribed range of vehicle 100 is opened. In a second embodiment, an indicator corresponding to a type of energy source supplied by a supply facility located within a prescribed range of a vehicle 100A lights up.

Figure 6:
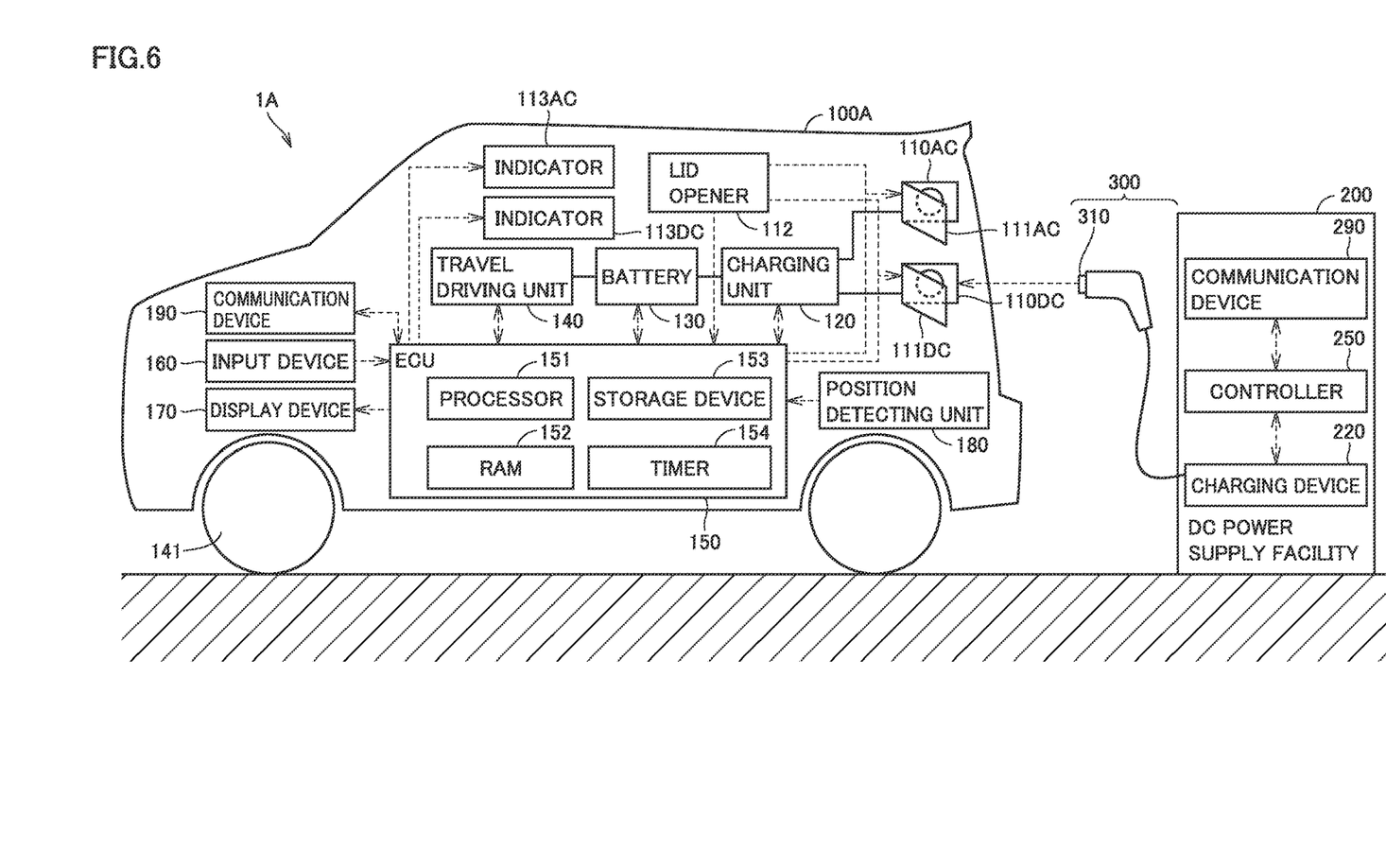
FIG. 6 is a configuration diagram of a vehicle and a power supply facility of a vehicle system according to a second embodiment.

FIG. 6 is a configuration diagram of vehicle 100A and a power supply facility of a vehicle system 1A according to the second embodiment. Referring to FIG. 6, in addition to the components of vehicle 100 of vehicle system 1 according to the first embodiment, vehicle 100A of vehicle system 1A according to the second embodiment includes indicators 113AC and 113DC. Each of indicators 113AC and 113DC includes a light emitting diode (LED).

Figure 7:
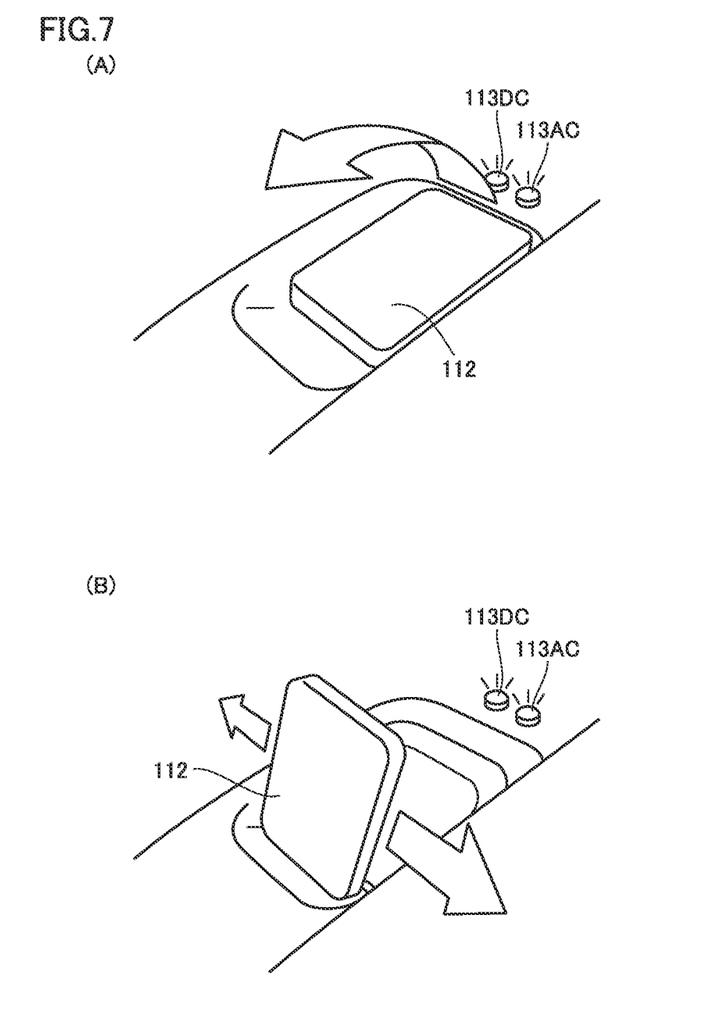
FIG. 7 schematically shows a lid opener and indicators in the second embodiment.

FIG. 7 schematically shows lid opener 112 and indicators 113AC and 113DC in the second embodiment. Referring to FIG. 7, lid opener 112 is similar to that in FIG. 4, and thus, description thereof will not be repeated.

As shown in FIG. 7, in the present embodiment, two indicators 113AC and 113DC are provided close to lid opener 112 and on the front side of vehicle 100A with respect to lid opener 112. Since lid 111AC is provided on the right side of vehicle 100A, indicator 113AC corresponds to a right-side indicator of the two indicators. Since lid 111DC is provided on the left side of vehicle 100A, indicator 113DC corresponds to a left-side indicator of the two indicators.

Figure 8:
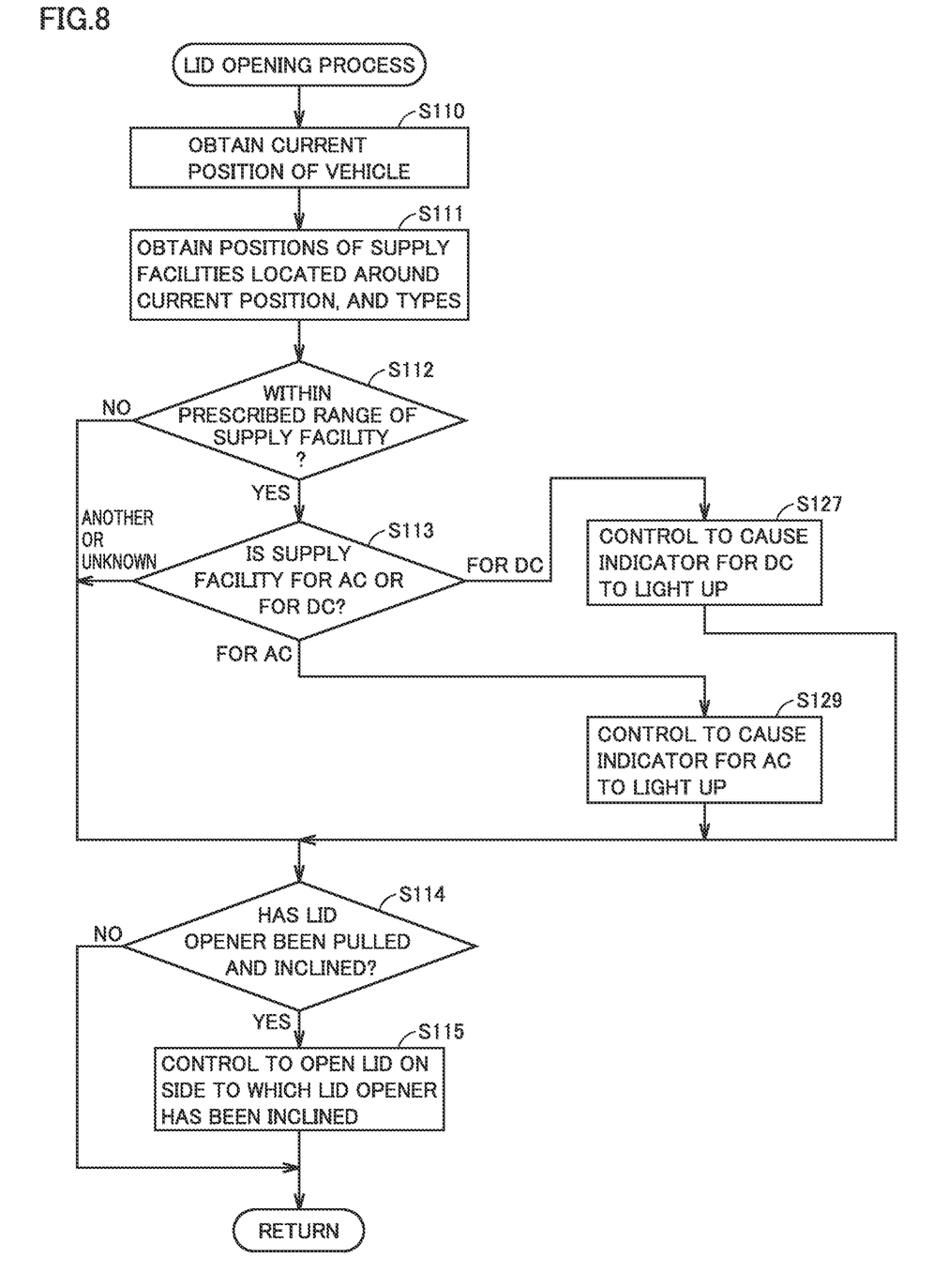
FIG. 8 is a flowchart showing a flow of a lid opening process in the second embodiment.

FIG. 8 is a flowchart showing a flow of a lid opening process in the second embodiment. The lid opening process is invoked from a higher-level process every prescribed time period and performed by processor 151 of ECU 150 of vehicle 100A. Referring to FIG. 8, the processing from step S110 to step S115 is similar to that in FIG. 5, and thus, description thereof will not be repeated.

When processor 151 determines in step S113 that the supply facility is DC power supply facility 200, processor 151 transmits, to indicator 113DC, a control signal for causing indicator 113DC corresponding to lid 111DC for DC charging to light up, and performs control such that indicator 113DC lights up (step S127). Thereafter, processor 151 moves the process to step S114.

When processor 151 determines in step S113 that the supply facility is AC power supply facility 400, processor 151 transmits, to indicator 113AC, a control signal for causing indicator 113AC corresponding to lid 111AC for AC charging to light up, and performs control such that indicator 113AC lights up (step S129). Thereafter, processor 151 moves the process to step S114.

Third Embodiment

In the first and second embodiments, lid opener 112 is of lever type. In a third embodiment, lid openers 114AC and 114DC are of push button type.

Figure 9:
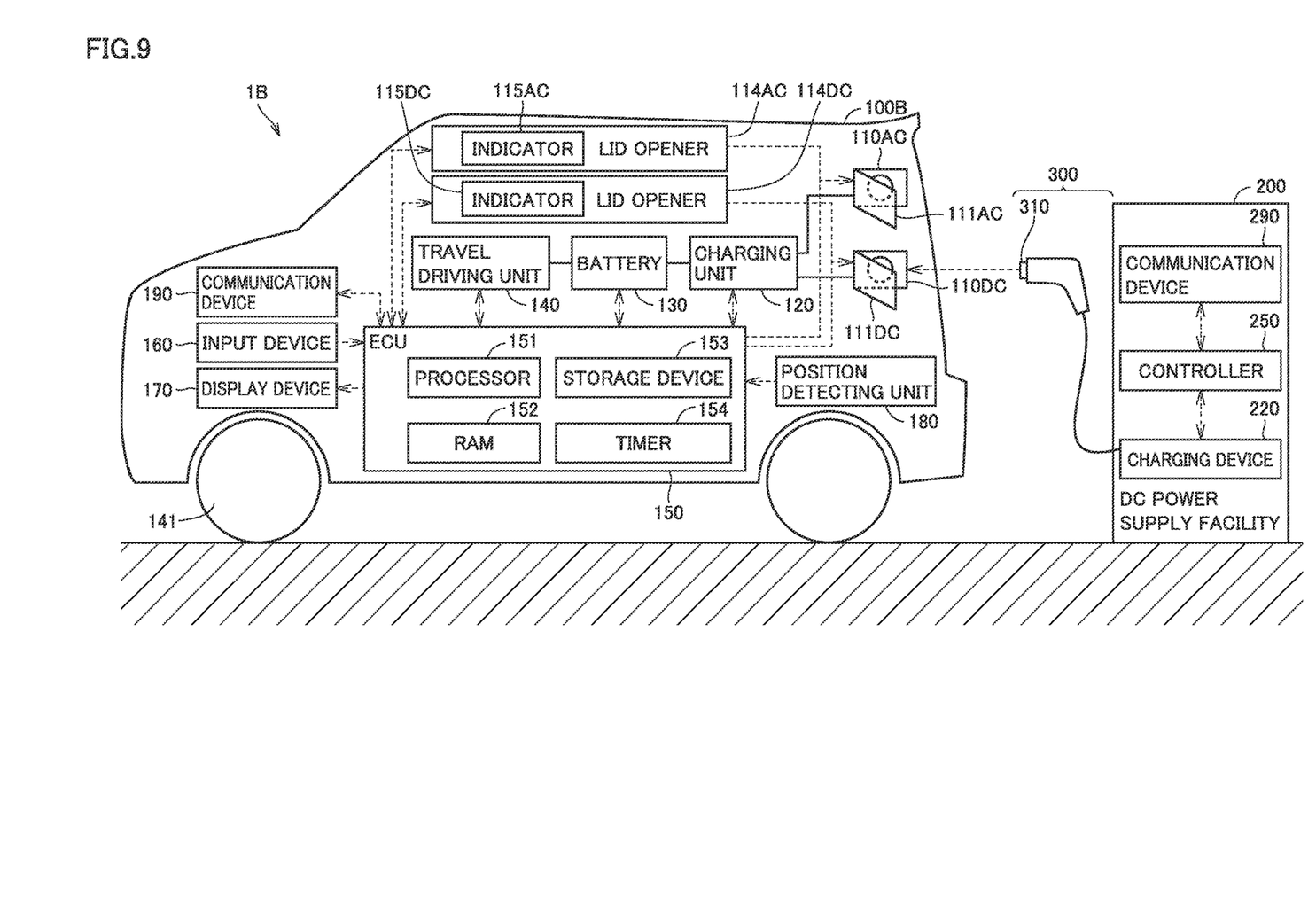
FIG. 9 is a configuration diagram of a vehicle and a power supply facility of a vehicle system according to a third embodiment.

FIG. 9 is a configuration diagram of a vehicle 100B and a power supply facility of a vehicle system 1B according to the third embodiment. Referring to FIG. 9, vehicle 100B of vehicle system 1B according to the third embodiment is different from vehicle 100A of vehicle system 1A according to the second embodiment in terms of lid opener 112 and indicators 113AC and 113DC. Vehicle 100B according to the third embodiment includes lid openers 114AC and 114DC of push button type. Indicators 115AC and 115DC are provided within lid openers 114AC and 114DC, respectively. Pressed portions of lid openers 114AC and 114DC are configured to allow the light emitted from indicators 115AC and 115DC provided within lid openers 114AC and 114DC to transmit to the outside.

Figure 10:
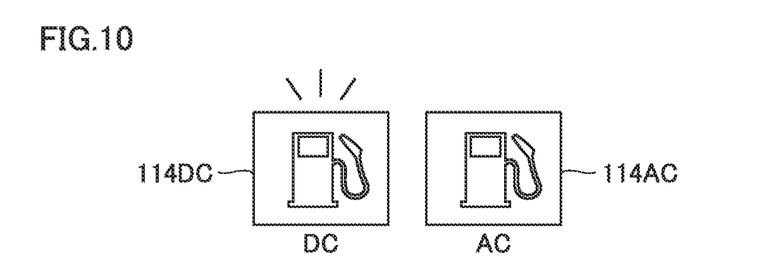
FIG. 10 schematically shows a lid opener in the third embodiment.

FIG. 10 schematically shows lid openers 114AC and 114DC in the third embodiment. Referring to FIG. 10, in the present embodiment, lid openers 114AC and 114DC are provided under an instrument panel of a dashboard. However, lid openers 114AC and 114DC may be provided at another position.

Lid openers 114AC and 114DC are configured to be pressable by the user, and when lid opener 114AC or 114DC is pressed, a signal indicating that lid opener 114AC or 114DC has been pressed is transmitted to processor 151 of ECU 150. LED indicators 115AC and 115DC are provided within the buttons of lid openers 114AC and 114DC, respectively. Lid openers 114AC and 114DC are configured such that indicators 115AC and 115DC emit light in accordance with a lighting signal from processor 151 of ECU 150, thereby allowing the light to transmit to outside the buttons. FIG. 10 shows a state in which lid opener 114DC is shining.

Since lid 111AC is provided on the right side of vehicle 100B, lid opener 114AC corresponds to a right-side lid opener of the two lid openers. Since lid 111DC is provided on the left side of vehicle 100B, lid opener 114DC corresponds to a left-side lid opener of the two lid openers.

Upon reception of the signal indicating that lid opener 114AC or 114DC has been pressed, processor 151 of ECU 150 transmits a control signal for opening lid 111AC on the right side of vehicle 100B to lid 111AC, when the received signal indicates that lid opener 114AC on the right side has been pressed. In contrast, when the received signal indicates that lid opener 114DC on the left side has been pressed, processor 151 of ECU 150 transmits a control signal for opening lid 111DC on the left side of vehicle 100B to lid 111DC.

Figure 11:
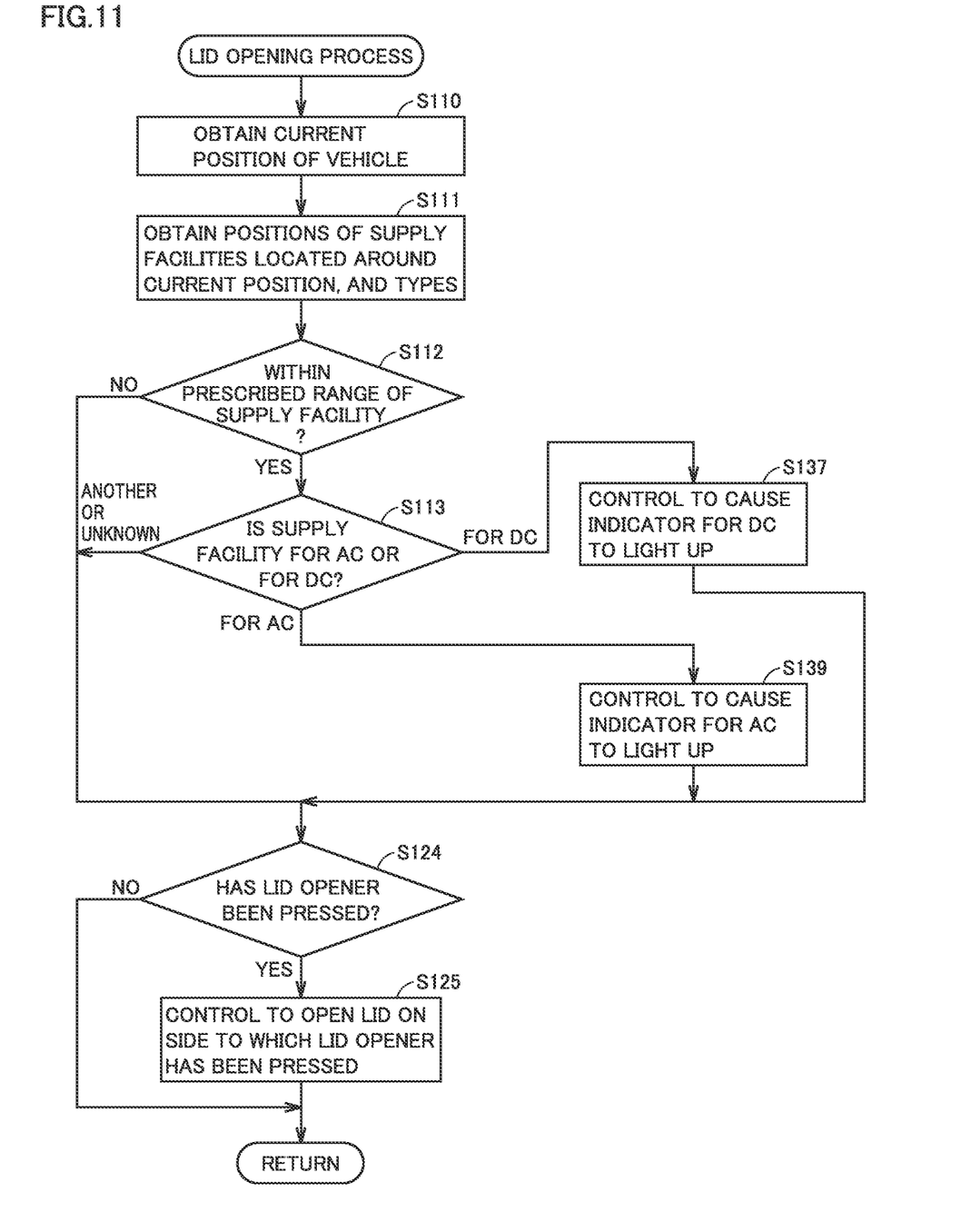
FIG. 11 is a flowchart showing a flow of a lid opening process in the third embodiment.

FIG. 11 is a flowchart showing a flow of a lid opening process in the third embodiment. The lid opening process is invoked from a higher-level process every prescribed time period and performed by processor 151 of ECU 150 of vehicle 100B. Referring to FIG. 11, the processing from step S110 to step S113 is similar to that in FIG. 5, and thus, description thereof will not be repeated.

When processor 151 determines in step S113 that the supply facility is DC power supply facility 200, processor 151 transmits, to lid opener 114DC, a control signal for causing indicator 115DC of lid opener 114DC for DC to light up, and performs control such that indicator 115DC of lid opener 114DC lights up (step S137). Thereafter, processor 151 moves the process to step S124.

When processor 151 determines in step S113 that the supply facility is AC power supply facility 400, processor 151 transmits, to lid opener 114AC, a control signal for causing indicator 115AC of lid opener 114AC for AC to light up, and performs control such that indicator 115AC of lid opener 114AC lights up (step S139). Thereafter, processor 151 moves the process to step S124.

In step S124, processor 151 determines whether lid opener 114AC or 114DC has been pressed (step S124). When processor 151 determines that lid opener 114AC or 114DC has been pressed (YES in step S124), processor 151 controls the actuator of the lid corresponding to the pressed lid opener so as to open the lid (step S125). When processor 151 determines that lid opener 114AC or 114DC has not been pressed (NO in step S124), and after step S125, processor 151 returns the process to the higher-level process from which the lid opening process has been invoked.

[Modifications]

(1) In the above-described first embodiment, as described with reference to FIGS. 3 and 4, lid opener 112 corresponds to the operation unit for opening lids 111AC and 111DC. However, the present disclosure is not limited to the foregoing. An operation unit having another structure may be used as long as one operation unit is operable in two stages to open any one of two lids 111AC and 111DC. In the first embodiment, the first-stage operation is an operation for pulling lid opener 112. The second-stage operation is an operation for indicating the position of the lid to be opened. When the type of the supply facility within the prescribed range is known at the time of the first-stage operation, the lid corresponding to this supply facility is opened.

(2) In the above-described first embodiment, as described with reference to FIG. 4, indicators 113AC and 113DC are provided on the floor surface in the vehicle interior close to lid opener 112. However, the present disclosure is not limited to the foregoing. Indicators 113AC and 113DC may be provided at another location in the vehicle interior, e.g., on the dashboard or the instrument panel.

(3) In the above-described first embodiment, as shown in step S117 and step S119 in FIG. 5, even when lid opener 112 is inclined to the side opposite to the side corresponding to the supply facility determined by processor 151, the process for not transmitting the control signal for opening the lid on the opposite side is performed, thereby performing the process for not opening, in response to the operation by lid opener 112, the lid that does not correspond to the energy source supplied by the specified supply facility.

However, the present disclosure is not limited to the foregoing. The lids may include lock mechanisms that physically lock the lids, and the lock mechanism may lock the lid on the side opposite to the side corresponding to the supply facility determined by processor 151, thereby performing the process for not opening, in response to the operation by lid opener 112, the lid that does not correspond to the energy source supplied by the specified supply facility.

Alternatively, the lids may include lock mechanisms that physically lock the lids, and the lock mechanisms may normally lock both of the lids, and the lock mechanism of the lid on the side opposite to the side corresponding to the supply facility determined by processor 151 may not be unlocked, thereby performing the process for not opening, in response to the operation by lid opener 112, the lid that does not correspond to the energy source supplied by the specified supply facility. In this case, the lock mechanism of the lid on the side corresponding to the supply facility determined by processor 151 is unlocked in response to the operation by lid opener 112.

(4) In the above-described second embodiment, vehicle 100A may include wires that transmit the operation of lid opener 112 to lid 111AC and lid 111DC. In this case, when lid opener 112 is pulled and inclined to the right side, the wire connected to lid 111AC on the right side of vehicle 100 is pulled, and when the wire connected to lid 111AC is pulled, lid 111AC is opened. When lid opener 112 is pulled and inclined to the left side, the wire connected to lid 111DC on the left side of vehicle 100 is pulled, and when the wire connected to lid 111DC is pulled, lid 111DC is opened.

(5) In the above-described third embodiment, each of lid openers 114AC and 114DC is a physical button. However, the present disclosure is not limited to the foregoing. Each of lid openers 114AC and 114DC may be a button displayed on a touch panel and pressing of the displayed button may be detected by the touch panel. In this case, light emission of indicators 115AC and 115DC is shown by light emission displayed on the touch panel.

(6) In the above-described third embodiment, indicators 115AC and 115DC are provided within lid openers 114AC and 114DC, respectively. However, the present disclosure is not limited to the foregoing. Indicators 115AC and 115DC may be provided separately from lid openers 114AC and 114DC.

(7) In the above-described embodiments, as shown in FIGS. 3, 6 and 9, each of vehicles 100, 100A and 100B is a battery electric vehicle that can travel using only the electric power stored in battery 130. However, the present disclosure is not limited to the foregoing. The vehicle in the present embodiment may only be a vehicle including a battery. For example, the vehicle in the present embodiment may be a plug-in hybrid electric vehicle that can travel using both electric power stored in a battery and an output of an engine, or may be a fuel cell electric vehicle that can travel using both electric power stored in a battery and electric power generated by a fuel cell.

(8) In the above-described embodiments, vehicle 100 includes lid 111AC that covers power supply port 110AC for AC power, and lid 111DC that covers power supply port 110DC for DC power. However, the present disclosure is not limited to the foregoing. The vehicle may only include two lids that cover receiving ports that receive two energy sources, respectively. For example, the vehicle may include a lid that covers a power supply port for AC power or DC power, and a lid that covers a receiving port for fuel such as gasoline, light oil and hydrogen.

(9) In the above-described second and third embodiments, as shown in step S127 and step S129 in FIG. 8 and step S137 and step S139 in FIG. 11, indicators 113AC, 113DC, 115AC, and 115DC emit light to inform the user about the lid to be opened. However, the present disclosure is not limited to the foregoing. In addition to or instead of light emission of the indicators, voice from a speaker or representation on a display may be used to inform the user about the lid to be opened.

(10) Each of the above-described embodiments can be understood as the disclosure of the lid system applied to vehicle 100, 100A, 100B of vehicle system 1, 1A, 1B, the disclosure of vehicle system 1, 1A, 1B, or the disclosure of vehicle 100, 100A, 100B. In addition, each of the above-described embodiments can be understood as the disclosure of the method for opening the lid or the program of the lid opening process shown in FIG. 5, 8 or 11 in vehicle system 1, 1A, 1B, the lid system, or vehicle 100, 100A, 100B.

SUMMARY (1) As shown in FIGS. 2, 3, 6, and 9, a lid system applied to a vehicle system (e.g., vehicle system 1, 1A, 1B) is a system including a plurality of lids (e.g., lids 111AC, 111DC) of a vehicle (e.g., vehicle 100, 100A, 100B). As shown in FIGS. 3, 6 and 9, the lid system includes: a first lid (e.g., lid 111AC) that covers a first receiving port (e.g., power supply port 110AC, and may be an oil supply port) that receives a first energy source (e.g., AC power, and may be fuel such as gasoline, light oil and hydrogen), the first lid being openable and closable; a second lid (e.g., lid 111DC) that covers a second receiving port (e.g., power supply port 110DC, and may be an oil supply port) that receives a second energy source (e.g., DC power in the above-described embodiments, and may be fuel such as gasoline, light oil and hydrogen), the second lid being openable and closable; an operation unit (e.g., lid opener 112, 114AC, 114DC) for opening the first lid and the second lid; a detecting unit (e.g., position detecting unit 180) that detects a current position of the vehicle; and a control unit (e.g., ECU 150) that controls the lid system.

As shown in FIGS. 5, 8 and 11, the control unit obtains positions of supply facilities of the first energy source or the second energy source (e.g., DC power supply facilities 200 or AC power supply facilities 400, and may be gasoline supply facilities, light oil supply facilities, or hydrogen supply facilities) (e.g., step S111), specifies a supply facility of the supply facilities, the supply facility being located at a position close to the current position detected by the detecting unit (e.g., step S110, step S112), and performs a prescribed process for opening, by the operation unit, the lid corresponding to an energy source supplied by the specified supply facility (e.g., step S113 to step S119, step S127, step S129, step S137, step S139).

Thus, the process for opening, by the operation unit, the lid corresponding to the energy source supplied by the supply facility located at the position close to the current position of the vehicle is performed. As a result, the lid corresponding to the supply facility of the energy source can be opened more easily.

(2) As shown in FIG. 5, the prescribed process includes a process for opening, in response to an operation by the operation unit, the lid corresponding to the energy source supplied by the specified supply facility (e.g., step S116 to step S119).

Thus, the process for opening, in response to the operation by the operation unit, the lid corresponding to the energy source supplied by the supply facility located at the position close to the current position of the vehicle is performed. As a result, the lid corresponding to the supply facility of the energy source can be opened more easily.

(3) As shown in FIG. 5, the operation unit is configured to be operable in two stages, and the control unit opens the lid corresponding to the energy source supplied by the specified supply facility, in response to a first-stage operation by the operation unit (e.g., step S116 to step S119).

Thus, the process for opening the lid corresponding to the energy source supplied by the supply facility located at the position close to the current position of the vehicle, in response to the first-stage operation by the operation unit configured to be operable in two stages is performed. As a result, the lid corresponding to the supply facility of the energy source can be opened more easily.

(4) As shown in FIG. 4, the operation unit is configured to designate the lid to be opened, through a second-stage operation. As shown in FIG. 5, the prescribed process includes a process for opening the lid designated through the second-stage operation by the operation unit, when the energy source supplied by the supply facility located at the position close to the current position detected by the detecting unit cannot be specified (e.g., step S113 to step S115).

Thus, the process for opening the lid designated through the second-stage operation by the operation unit, when the energy source supplied by the supply facility located at the position close to the current position of the vehicle cannot be specified is performed. As a result, the lid corresponding to the supply facility of the energy source can be opened.

(5) As shown in FIG. 5, the prescribed process includes a process for not opening, in response to the operation by the operation unit, the lid that does not correspond to the energy source supplied by the specified supply facility (e.g., step S117, step S119).

Thus, the process for not opening, in response to the operation by the operation unit, the lid that does not correspond to the energy source supplied by the supply facility located at the position close to the current position of the vehicle is performed. As a result, the lid that does not correspond to the supply facility of the energy source cannot be opened.

(6) As shown in FIGS. 8 and 11, the prescribed process includes a process for notifying a user about the lid corresponding to the energy source supplied by the specified supply facility, of the plurality of lids (e.g., step S113, step S127, step S129, step S137, step S139).

Thus, the process for notifying the user about the lid to be opened, which corresponds to the energy source supplied by the supply facility located at the position close to the current position of the vehicle, of the plurality of lids is performed. As a result, the lid corresponding to the supply facility of the energy source can be opened more easily.

Although the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A lid system including a plurality of lids of a vehicle, the lid system comprising:
   a first lid that covers a first receiving port that receives a first energy source, the first lid being openable and closable;
   a second lid that covers a second receiving port that receives a second energy source, the second lid being openable and closable;
   an operation unit for opening the first lid and the second lid, the operation unit including a lid opener operable by a user to open the first lid and the second lid;
   a detecting unit that detects a current position of the vehicle; and
   a control unit that controls the lid system, wherein the control unit:
      obtains positions of supply facilities of the first energy source or the second energy source, specifies a supply facility of the supply facilities, the specified supply facility being located at a position close to the current position detected by the detecting unit, determines whether an energy source type supplied by the specified supply facility supplies is detectable;

determines whether the lid opener has been operated by the user; and based on the determination that the energy source type is detectable and the determination that the lid opener has been operated, performs a prescribed process to open the lid corresponding to the energy source matching the detected energy source type supplied by the specified supply facility, wherein the operation unit is configured to be operable in two stages, wherein the control unit opens the lid corresponding to the energy source supplied by the specified supply facility, in response to a first-stage operation by the operation unit, wherein the operation unit is configured to designate the lid to be opened, through a second-stage operation, wherein the prescribed process includes a process for opening the lid designated through the second-stage operation by the operation unit, when the energy source type supplied by the supply facility located at the position close to the current position cannot be detected, wherein the lid opener is configured to be pulled by the user during operation, and wherein when the energy source type cannot be detected, the control unit is configured to:

determine whether the lid opener has been pulled by the user, based on a determination that the lid opener has been pulled, determine an inclination direction of the lid opener, determine which lid to open based on the inclination direction of the lid opener, and perform the prescribed process to open the determined lid.

2. The lid system according to claim 1, wherein the inclination direction of the lid opener corresponds to a position of the first lid and the second lid on the vehicle.

3. The lid system according to claim 2, wherein the control unit is further configured to:

based on a determination that the lid opener is inclined to a left direction, perform a prescribed process to open the lid positioned on a left side of the vehicle and based on a determination that the lid opener is inclined to a right direction, perform a prescribed process to open the lid positioned on a right side of the vehicle.

* * * * *